(12) United States Patent
Shinozuka

(10) Patent No.: US 7,909,951 B2
(45) Date of Patent: Mar. 22, 2011

(54) METHOD OF ASSEMBLING LIGHT SCANNING APPARATUS

(75) Inventor: Yukio Shinozuka, Ueda (JP)

(73) Assignee: Shinano Kenshi Kabushiki Kaisha, Ueda-Shi, Nagano (JP)

( * ) Notice: Subject to any disclaimer, the term of this patent is extended or adjusted under 35 U.S.C. 154(b) by 0 days.

(21) Appl. No.: 12/831,682

(22) Filed: Jul. 7, 2010

(65) Prior Publication Data

US 2011/0011513 A1    Jan. 20, 2011

(30) Foreign Application Priority Data

Jul. 16, 2009    (JP) .................................. 2009-167448

(51) Int. Cl.
  *B32B 41/00*    (2006.01)
(52) U.S. Cl. ............. 156/64; 156/196; 156/297; 29/834
(58) Field of Classification Search ..................... 156/64, 156/196, 297; 29/733, 734, 740, 742, 833, 29/834, 835
  See application file for complete search history.

(56) References Cited

FOREIGN PATENT DOCUMENTS

JP    2006-293116 A    10/2006

*Primary Examiner* — George R Koch, III
(74) *Attorney, Agent, or Firm* — Birch, Stewart, Kolasch & Birch, LLP

(57) ABSTRACT

The method of assembling a light scanning apparatus is capable of fine-adjusting a scanning angle and resonance frequency of a mirror section. The method comprises: a step of measuring the scanning angle and resonance frequency of the mirror section, with actuating a vibration source, in a state where a substrate holding member is temporarily fixed on a base member; a step of moving the substrate holding member, in the longitudinal direction of a substrate after releasing the temporarily-fixed state of the substrate holding member; a step of fine-adjusting a substrate-holding position by repeating the step of moving the substrate holding member; and a step of fixing the substrate holding member after the substrate-holding position is set. The substrate-holding position of the substrate holding member provided on the base member can be varied, without varying the position of the mirror section with respect to the base member in the fine-adjusting step and said fixing step, when the light scanning apparatus is assembled.

5 Claims, 3 Drawing Sheets

FIG3.B

METHOD OF ASSEMBLING LIGHT SCANNING APPARATUS

CROSS-REFERENCE TO RELATED APPLICATION

This application is based upon and claims the benefit of priority of the prior Japanese Patent Application No. P2009-167448, filed on Jul. 16, 2009, and the entire contents of which are incorporated herein by reference.

FIELD

The present invention relates to a method of assembling a light scanning apparatus, in which scanning operation is performed with reflecting a light beam irradiated from a light source by a mirror section.

BACKGROUND

A light scanning apparatus, which scans with a light beam, e.g., laser beam irradiated from a light source, is used in optical equipments, e.g., barcode reader, laser printer, head mounted display, or light intake units of imaging apparatuses, e.g., infrared camera.

A conventional light scanning apparatus is disclosed in Japanese Laid-open Patent Publication No. P2006-293116A. The conventional apparatus is shown in FIG. 5. A substrate 52, which is composed of, for example, stainless steel or silicon, is held by a holding member 51 like a cantilever, and an opening part 53 is formed in a free end part of the substrate 52. A mirror section 55 is provided in the opening part 53, and both sides of the mirror section 55 are connected to the substrate 52 by beams 54. A surface of the mirror section 55 is polished like a mirror, reflection coating is formed on the surface of the mirror section 55, or a mirror is adhered thereon.

A vibration source 56, which is composed of a film of a piezoelectric substance, a magnetostrictive substance or a permanent magnet, is provided on the substrate 52. For example, in case of using the piezoelectric substance, the vibration source 56 is extended by applying positive voltage and shrunk by applying negative voltage, so that the substrate 52 is bent. By bending the substrate 52 upward and downward, twisting vibration is generated in the beams 54 and the mirror section 55 is swung.

Driving frequency near resonance frequency of the mirror section 55 and the beams 54 is maintained, and the light scanning operation is performed with reflecting a laser beam by the twisting-vibrated mirror section 55. With this structure, a production cost of the apparatus can be smaller than that of a light scanning apparatus in which a minute mirror produced by a micro electro mechanical system (MEMS) is swung, and great twisting vibration can be generated by a small vibration source.

In the above described light scanning apparatus, characteristics of the apparatus, e.g., scanning angle (amplitude), resonance frequency, will be varied according to manufacturing accuracy of the substrate 52, which is a metal plate, and assembling accuracy of the vibration source. Especially, the scanning angle of the mirror section 55 and the resonance frequency thereof are varied according to a supporting position of the substrate 52, which is held by a base 57 and the holding member 51 like a cantilever (see FIGS. 6A and 6B). Thus, it is desirable to fine-adjust the supporting position of the substrate 52 according to a size of the substrate 52, etc.

In case of attaching the light scanning apparatus to an optical equipment, e.g., laser printer, positional relationship between the mirror section 55 and the base 57 must be maintained in a prescribed tolerance. Positional relationship between a light source, e.g., laser means, of the optical equipment and the light scanning apparatus cannot be varied after attaching the light scanning apparatus. Further, in the light scanning apparatus, positional relationship between the mirror section 55 and the base 57, which supports the mirror section 55 together with the holding member 51, cannot be varied, either. If the positional relationship between the mirror section 55 and the base 57 is varied, the positional relationship between the mirror section 55 and the base 57 cannot maintained in the prescribed tolerance and the laser beam cannot be emitted toward the mirror section 55 as designed.

SUMMARY

Accordingly, it is an object in one aspect of the invention to provide a method of assembling a light scanning apparatus, in which a substrate-holding position of a substrate holding member provided to a base member can be varied, without changing positional relationship between a mirror section and the base member, so as to fine-adjust a scanning angle of the mirror section and resonance frequency thereof.

To achieve the object, the light scanning apparatus includes: a substrate having an opening part; a mirror section being located in the opening part of the substrate, the mirror section having side parts, which are held by a beam; and a vibration source being provided on the substrate, the vibration source bending the substrate so as to swing the mirror section on the beam which acts as a pivot shaft, wherein the swung mirror section reflects an irradiated light for scanning, and the method of the present invention is characterized in, that the substrate, a substrate holding member, which holds one of longitudinal ends of the substrate like a cantilever, and a base member, which holds the substrate holding member movably, are separately provided, that the method comprises:
  a step of measuring a scanning angle and resonance frequency of the mirror section, with actuating the vibration source, in a state where the substrate holding member is temporarily fixed on the base member;
  a step of moving the substrate holding member, in the longitudinal direction of the substrate, on the base member after releasing the temporarily-fixed state of the substrate holding member;
  a step of fine-adjusting a substrate-holding position of the substrate holding member by repeating said step of moving the substrate holding member, in the longitudinal direction of the substrate, on the base member after releasing the temporarily-fixed state of the substrate holding member; and
  a step of fixing the substrate holding member on the base member after the substrate-holding position is set, and
  that the substrate-holding position of the substrate holding member provided on the base member can be varied, without varying the position of the mirror section with respect to the base member in said fine-adjusting step and said fixing step, when the light scanning apparatus is assembled.

In the method, the substrate holding member may be fixed to the substrate and the base member by adhesive.

In the method, the substrate holding member may comprise a pair of clamping members, which vertically clamp the substrate above the base member.

In the method, a press plate may be stacked on and fixed to the base member and may press the clamping members onto the base member so as to fix the clamping members, and the press plate may be fixed to a supporting section of the base member, by a screw, in a state where the clamping members clamp the substrate above the base member, thereby the clamping members are clamped between the press plate and the base member, and the substrate-holding position is fixed.

In the method, the members on and under the substrate holding member may be fixed by adhesive or caulking.

In the method of the present invention, the substrate, the substrate holding member, which holds one of the longitudinal ends of the substrate like a cantilever, and the base member, which holds the substrate holding member movably, are separately provided, so that the substrate-holding position of the substrate holding member provided on the base member can be varied. Therefore, when the substrate holding member is assembled, the substrate-holding position of the substrate holding member provided on the base member can be fine-adjusted without changing the position of the mirror section with respect to the base member (with maintaining the positional relationship between the mirror section and the base member in a prescribed tolerance and without deviating the mirror section from a light path), so that the scanning angle (amplitude) of the mirror section and the resonance frequency thereof can be fine-adjusted.

By using adhesive, the substrate can be easily fixed to the base member together with the substrate holding member.

By employing the clamping members which vertically clamp the substrate above the base member, the substrate can be securely held like a cantilever.

By fixing the press plate to the supporting section of the base member by the screw, the clamping members can be clamped by the press plate and the base member so that the substrate supporting position can be fixed. Therefore, the substrate is not influenced by bending and warping caused by the screw, so that the substrate can be held by the clamping members like a cantilever.

By fixing the members on and under the substrate holding member by adhesive or caulking, they can be easily fixed.

BRIEF DESCRIPTION OF THE DRAWINGS

Embodiments of the present invention will now be described by way of examples and with reference to the accompanying drawings, in which:

FIG. 3B is a vertical sectional view thereof taken a line A-A of FIG. 3A;

DESCRIPTION OF THE EMBODIMENTS

Figure 1A:
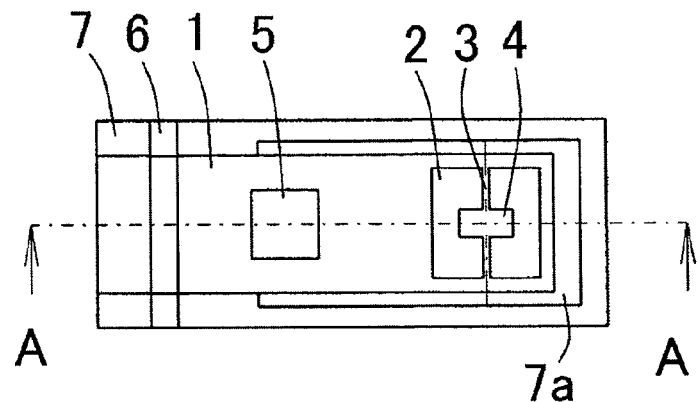
FIG. 1A is a plan view of a first embodiment of the light scanning apparatus.

Preferred embodiments of the present invention will now be described in detail with reference to the accompanying drawings. In the following embodiments, a scanner for a laser beam printer will be explained as the light scanning apparatus.

A first embodiment of the light scanning apparatus will be explained with reference to FIGS. 1A and 1B.

A substrate 1 is a rectangular plate composed of, for example, stainless steel (SU304) or silicon (Si). An opening part (through-hole) 2 is formed in a front end part of the substrate 1. A beam 3 is spanned in the central part of the opening part 2, and a mirror section 4 is supported by the beam 3. The mirror section 4 is axial-symmetrically formed with respect to the beam 3. A vibration source 5 is provided on the substrate 1 and on the side opposite to the mirror section 4. The vibration source 5 is a piezoelectric element composed of lead zirconate titanate (PZT). One end of the substrate 1, on the vibration source 5 side, is held by a substrate holding member 6.

Vibration of the mirror section 4 will be explained. By applying positive (plus) voltage to a surface electrode of the piezoelectric element, a piezoelectric layer is extended, so that the substrate 1 is bent upward. On the other hand, by applying negative (minus) voltage to the surface electrode of the piezoelectric element, the piezoelectric layer is shrunk, so that the substrate 1 is bent downward. When the substrate 1 is bent, stationary waves generated in the substrate 1 twist the beam 3 and generate rotational moment in the mirror section 4, which is in a horizontal state, so that twisting vibration is generated.

By applying alternate voltage to the vibration source 5 to repeatedly bend parts of the substrate 1, which are on the both sides of the beam 3, in opposing directions, the mirror section 4 is vibrated with prescribed amplitude. A light, e.g., laser beam, is irradiated toward the mirror section 4 in a state where the mirror section 4 is swung on the beam 3 acting as a twist axis, with the prescribed amplitude, so that the reflected laser beam can be scanned.

Besides the piezoelectric element, a film of a piezoelectric substance, a magnetostrictive substance or a permanent magnet may be directly formed on the substrate 1 as the vibration source 5. The film may be formed by known film forming methods, e.g., aerosol deposition (AD) method, vacuum evaporation method, sputtering method, chemical vapor deposition (CVD) method, sol-gel method. By directly forming the film of a piezoelectric substance, a magnetostrictive substance or a permanent magnet on the substrate 1, a light scanning apparatus, which is driven at a low voltage and whose electric power consumption is low, can be produced.

In case of employing a magnetostrictive substance or a permanent magnet as the vibration source 5, an alternate current is passed through a coil located in the vicinity of the film of the magnetostrictive substance or permanent magnet formed on the substrate 1 so as to generate alternate magnetic fields, which are applied to the film-formed vibration source 5. Note that, in case of forming the film of the magnetostrictive substance or permanent magnet formed on the substrate 1, a nonmagnetic material is suitably selected as a material of the substrate 1 so as to efficiently bend the substrate 1.

Next, an assembly structure of the substrate holding member 6 constituted by a pair of clamping members 6a and 6b and a substrate-holding position on a base member 7 will be explained.

In the present embodiment, a pair of the clamping members 6a and 6b are capable of varying the substrate-holding position so as to fine-adjust a scanning angle of the mirror section 4 and resonance frequency thereof without changing or varying the position of the mirror section 4 with respect to the base member 7.

Firstly, the piezoelectric element is actuated in a state where the substrate holding member 6 is temporarily fixed to the base member 7 (a temporarily fixed state). Next, the substrate-holding position of the substrate holding member 6 is fine-adjusted (a variable state). Then, the substrate holding member 6 is fixed on the base member 7 after the substrate-holding position is set (a fixed state). Change of the substrate-holding position is performed in said order, i.e., the temporarily fixed state→the variable state→the fixed state.

Next, each of the states will be explained.

(1) The temporarily fixed state is a state where the substrate holding member 6 is temporarily fixed and the scanning angle of the mirror section 4 and the resonance frequency thereof can be measured with actuating the piezoelectric element.

(2) The variable state is a state where the substrate 1 is fixed and the substrate holding member 6 can be freely moved on the basis of the measured scanning angle and resonance frequency of the mirror section 4 which have been measured with actuating the piezoelectric element.

(3) The fixed state is a state where the position of the substrate holding member 6, which has been determined or set in the temporarily fixed state and the variable state, is finally fixed.

Note that, the temporarily fixed state and the variable state may be performed a plurality of times for fine-adjusting the scanning angle and resonance frequency of the mirror section 4. An example will be explained.

Figure 1B:
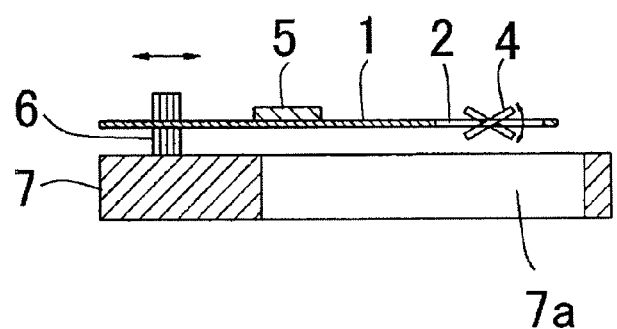
FIG. 1B is a vertical sectional view thereof.

In FIGS. 1A and 1B, a pair of the clamping members 6a and 6b, which are vertically arranged, are provided on the base member 7, and clamp one end of the substrate 1, on the vibration source 5 side, like a cantilever. The clamping members 6a and 6b are composed of metal, plastic, rubber, etc. The clamping members 6a and 6b may be composed of the same material or different materials. To easily position the clamping members 6a and 6b on the base member 7, holes may be formed in the clamping members 6a and 6b, and the clamping members 6a and 6b may be moved by using a jig which fits the holes.

An opening part 7a, which corresponds to the mirror section 4, is formed in the base member 7. The opening part 7a is formed to secure a light path of the laser beam irradiated toward the mirror section 4 and the reflected laser beam reflected therefrom.

The substrate 1 is vertically clamped and held by the clamping members 6a and 6b, which are provided on the base member 7. In this state, the clamping members 6a and 6b are temporarily clamped together with the base member 7, by a suitable jig (not shown), so as to temporarily fix the substrate 1 (The temporarily fixed state). In the temporarily fixed state, the piezoelectric element is actuated, and the scanning angle and the resonance frequency of the mirror section 4 are measured.

Next, in the temporarily fixed state, the temporal clamp with the suitable jig (not shown) is once released, so that the clamping members 6a and 6b can be moved (the variable state). The clamping members 6a and 6b are moved, on the base member 7, in the longitudinal direction of the substrate 1, and then the clamping members 6a and 6b are temporarily clamped together with the base member 7, by the suitable jig (not shown), so as to temporarily fix the substrate 1 again (the temporarily fixed state). In the temporarily fixed state, the scanning angle and the resonance frequency of the mirror section 4 are repeatedly measured. With this action, the substrate-holding position of the clamping members 6a and 6b can be fine-adjusted.

After the optimum substrate-holding position of the clamping members 6a and 6b is determined and set, the clamping member 6a is fixed to the base member 7, together with the substrate 1 and the clamping member 6b, by caulking (the fixed state).

By performing the above described steps, relationship between the substrate 1 (the mirror section 4), the base member 7 and the clamping members 6a and 6b is fixed, so that the relationship is not varied while operating the apparatus. To make secure the caulking state, adhesive may be applied to the substrate 1 (the mirror section 4), the base member 7 and the clamping members 6a and 6b.

Note that, in the above described sequential states (the temporarily fixed state→the variable state→the fixed state), the position of the mirror section 4 with respect to the base member 7 is not changed or varied.

Next, a second embodiment of the light scanning apparatus will be explained with reference to FIGS. 2A and 2B.

Figure 2A:
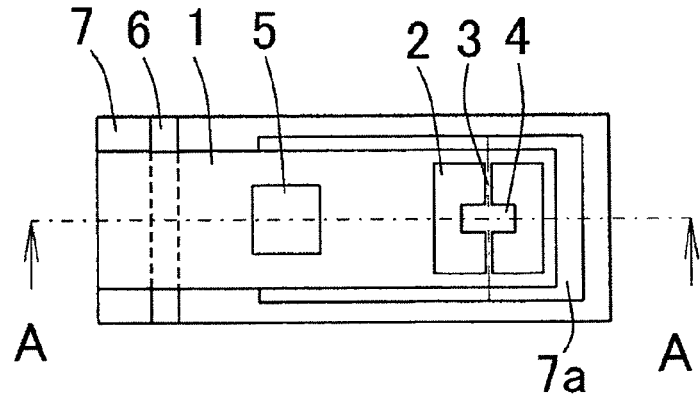
FIG. 2A is a plan view of a second embodiment of the light scanning apparatus in an operating state.
Figure 2B:
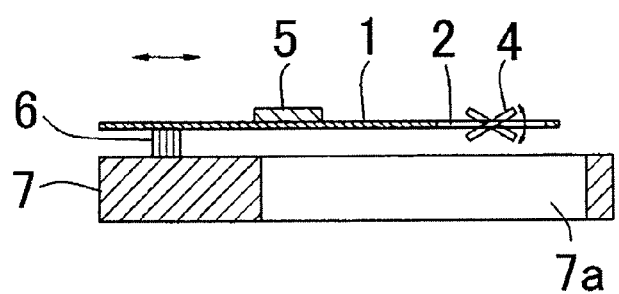
FIG. 2B is a vertical sectional view thereof taken a line A-A of FIG. 2A.

In FIGS. 2A and 2B, the substrate holding member 6 is fixed on the base member 7 by adhesive, and the one end of the substrate 1, on the vibration source 5 side, is fixed to the substrate holding member 6 by adhesive.

In FIGS. 2A and 2B, the substrate 1 is temporarily clamped by a suitable jig (not shown), so as to temporarily fix the substrate 1 (the temporarily fixed state). In the temporarily fixed state, the piezoelectric element is actuated, and the scanning angle and the resonance frequency of the mirror section 4 are measured. Next, the temporal clamp with the suitable jig (not shown) is once released (the variable state). The clamping member 6 is moved, on the base member 7, in the longitudinal direction of the substrate 1, and then the clamping member 6 is temporarily clamped, by the suitable jig (not shown), again (the temporarily fixed state). In the temporarily fixed state, the scanning angle and the resonance frequency of the mirror section are repeatedly measured. With this action, the substrate-holding position of the clamping member 6 can be fine-adjusted. After the substrate-holding position of the clamping member 6 is determined and set, the substrate 1, the clamping member 6 and the base member 7 are mutually fixed by adhesive (the fixed state). By performing the above described steps, relationship between the substrate 1 (the mirror section 4), the base member 7 and the clamping member 6 can be fixed, so that the relationship is not varied while operating the apparatus.

Note that, in the above described sequential states (the temporarily fixed state→the variable state→the fixed state), the position of the mirror section 4 with respect to the base member 7 is not changed or varied.

Next, a third embodiment of the light scanning apparatus will be explained with reference to FIGS. 3A and 3B.

Figure 3A:
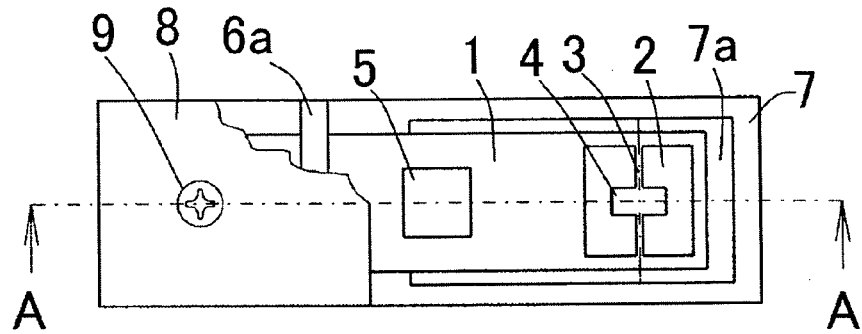
FIG. 3A is a plan view of a third embodiment of the light scanning apparatus in an operating state.
Figure 3A:
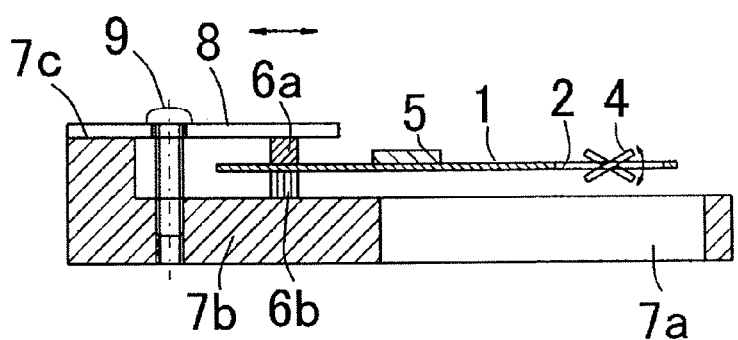

In FIGS. 3A and 3B, a pair of the clamping members 6a and 6b, which are vertically arranged, are provided on the base member 7, and clamp one end of the substrate 1, on the vibration source 5 side, like a cantilever. The clamping members 6a and 6b are composed of metal, plastic, rubber, etc. The clamping members 6a and 6b may be composed of the same material or different materials.

The opening part 7a, which corresponds to the mirror section 4, is formed in the base member 7. The opening part 7a is formed to secure the light path of the laser beam irradiated toward the mirror section 4 and the reflected laser beam reflected therefrom. The base member 7 has a supporting section 7b, which supports the clamping members 6a and 6b, and a plate supporting section 7c, whose height is higher than that of the supporting section 7b. One end part of a press plate 8 is stacked on to the plate supporting section 7c and fixed thereto.

The substrate 1 is vertically clamped and held by the clamping members 6a and 6b, which are provided on the base member 7. In this state, the press plate 8 and the base member 7 are fixed by a screw 9, which is located at a prescribed position so as not to pierce the substrate 1, so that the clamping members 6a and 6b can be fixed. In the state where the screw 9 is tightened (the temporarily fixed state), the piezoelectric element is actuated, and the scanning angle and the resonance frequency of the mirror section 4 are measured. Next, in the temporarily fixed state, the screw 9 is once loosened (the variable state). The clamping members 6a and 6b are moved, on the base member 7, in the longitudinal direction of the substrate 1, and then the screw 9 is tightened again (the temporarily fixed state). In the temporarily fixed state, the scanning angle and the resonance frequency of the mirror section 4 are repeatedly measured. With this action, the substrate-holding position of the clamping members 6a and 6b can be fine-adjusted. After the substrate-holding position of the clamping members 6a and 6b is determined and set, the screw 9 is tightened again, and a screw securing agent, e.g., UV curing agent, is applied to the screw 9 so as to fix the positional relationship between the clamping members 6a and 6b, the base member 7 and the substrate 1 (the fixed state). By performing the above described steps, the relationship between the substrate 1 (the mirror section 4), the base member 7 and the clamping members 6a and 6b is fixed, so that the relationship is not varied while operating the apparatus.

Note that, in the above described sequential states (the temporarily fixed state→the variable state→the fixed state), the position of the mirror section 4 with respect to the base member 7 is not changed or varied.

Next, a fourth embodiment of the light scanning apparatus will be explained with reference to FIGS. 4A and 4B.

Figure 4A:
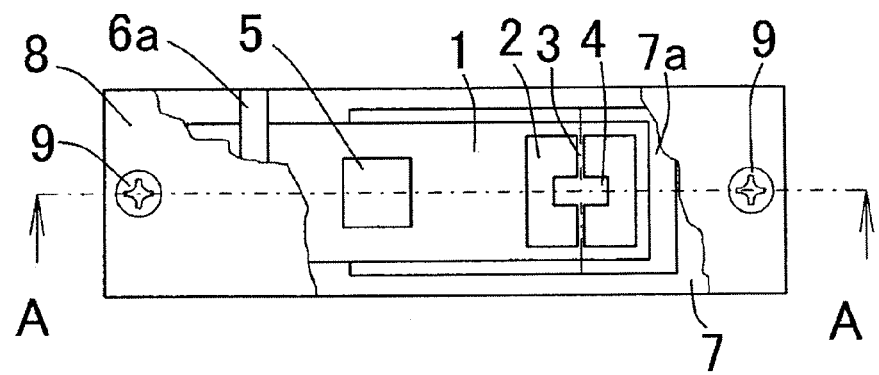
FIG. 4A is a plan view of a fourth embodiment of the light scanning apparatus in an operating state.
Figure 4B:
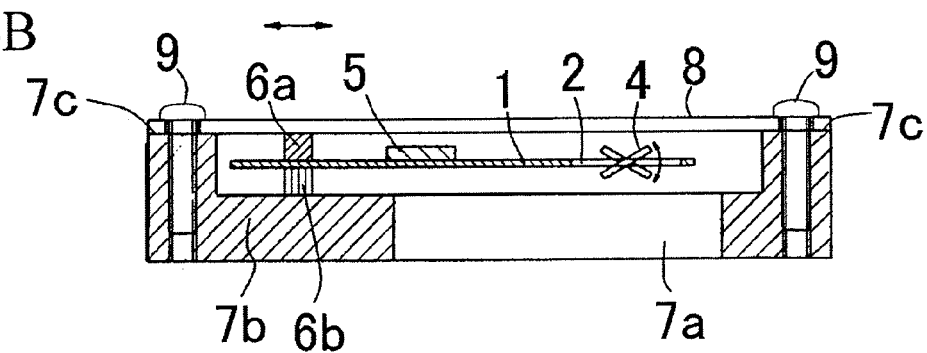
FIG. 4B is a vertical sectional view thereof taken a line A-A of FIG. 4A.
Figure 5:
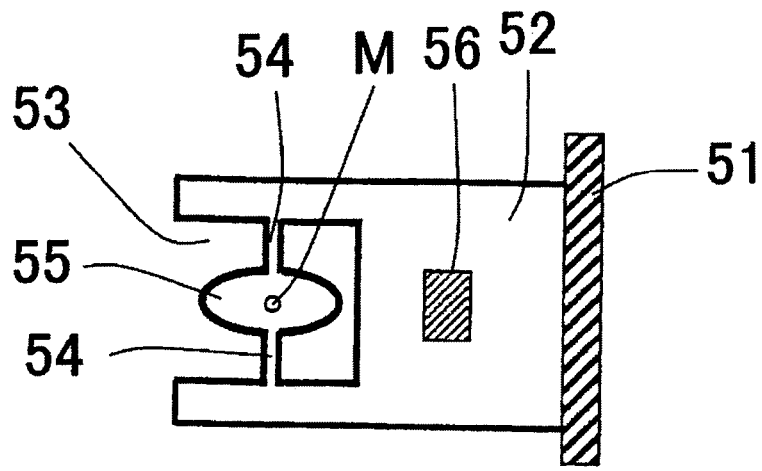
FIG. 5 is a plan view of the conventional light scanning apparatus.
Figure 6A:
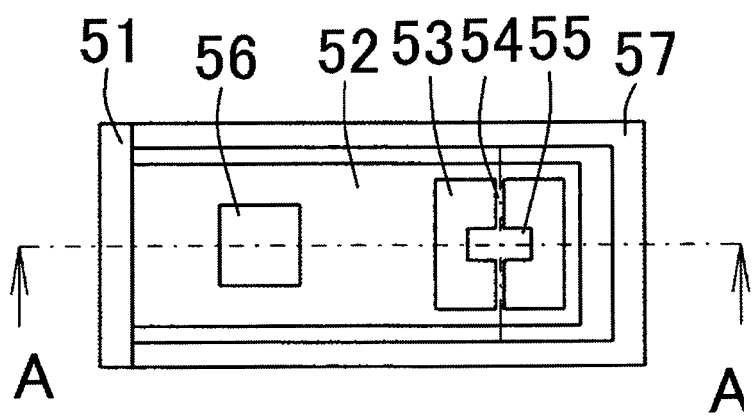
FIG. 6A is a plan view of the conventional light scanning apparatus in an operating state.
Figure 6B:
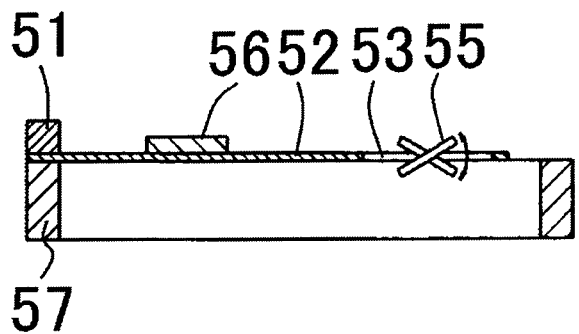
FIG. 6B is a vertical sectional view thereof taken a line A-A of FIG. 6A.

In FIGS. 4A and 4B, the base member 7 has the plate supporting sections 7c, which are respectively provided to longitudinal ends of the base member 7 and whose height is higher than that of the supporting section 7b. The substrate 1 is vertically clamped and held by the clamping members 6a and 6b, which are provided on the base member 7. In this state, the press plate 8 and the base member 7 are fixed by screws 9, which are located at prescribed positions so as not to pierce the substrate 1, so that the press plate 8 can be fixed.

Further, the fine adjusting process is performed in the sequential states (the temporarily fixed state→the variable state→the fixed state) as well as the embodiment shown in FIGS. 3A and 3B, so the fine adjusting process will be omitted.

Note that, the base member 7 may be extended like a tongue and the clamping member 6a may be pressed instead of the press plate 8. Further, the substrate 1 may be pressed instead of the clamping member 6a. In this case, number of parts can be reduced.

Note that, in case of employing a metal plate polished like a mirror as the substrate 1, the substrate 1 itself may act as the mirror section. In case of employing a nonmetal substrate or in case that high reflection performance is required for a metal substrate, a thin film may be formed on the mirror section 4 by known film forming methods, e.g., vacuum evaporation method, sputtering, CVD method, or a reflecting member, e.g., mirror, may be adhered on the mirror section 4.

The thin film of the mirror section 4 is composed of at least one substance selected from the group consisting of: gold (Au), silicon dioxide ($SiO_2$), aluminum (Al) and magnesium fluoride ($MgF_2$). Further, the thin film may be one-layer film or multi-layer film. By forming the thin film having a suitable thickness, the thin film having superior reflection performance can be produced. Further, the thin film may be formed on a silicon member or a ceramic member, e.g., $Al_2O_3$—TiC, which has been polished like a mirror and used as the reflecting member adhered to the mirror section 4. Note that, if only a mirror on one side is used, a polishing treatment for forming a mirror surface or a surface treatment for improving reflection ratio for a mirror on the other side may be omitted.

In case of employing the substrate which is composed of silicon (Si), stainless steel, e.g., SU304, or a material produced by growing carbon nanotubes, considering flatness of a mirror in operation or a required mirror size of a projector device, etc., a preferable thickness of the substrate 1 is 10 μm or more.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. A method of assembling a light scanning apparatus, the light scanning apparatus including: a substrate having an opening part; a mirror section being located in the opening part of the substrate, the mirror section having side parts, which are held by a beam; and a vibration source being provided on the substrate, the vibration source bending the substrate so as to swing the mirror section on the beam which acts as a pivot shaft, wherein the swung mirror section reflects an irradiated light for scanning, said method being characterized in, that the substrate, a substrate holding member, which holds one of longitudinal ends of the substrate like a cantilever, and a base member, which holds the substrate holding member movably, are separately provided, that said method comprises:

a step of measuring a scanning angle and resonance frequency of the mirror section, with actuating the vibration source, in a state where the substrate holding member is temporarily fixed on the base member;

a step of moving the substrate holding member, in the longitudinal direction of the substrate, on the base member after releasing the temporarily-fixed state of the substrate holding member;

a step of fine-adjusting a substrate-holding position of the substrate holding member by repeating said step of moving the substrate holding member, in the longitudinal direction of the substrate, on the base member after releasing the temporarily-fixed state of the substrate holding member; and a step of fixing the substrate holding member on the base member after the substrate-holding position is set, and that the substrate-holding position of the substrate holding member provided on the base member can be varied, without varying the position of the mirror section with respect to the base member in said fine-adjusting step and said fixing step, when the light scanning apparatus is assembled.

2. The method according to claim 1,
wherein the substrate holding member is fixed to the substrate and the base member by adhesive.

3. The method according to claim 1,
wherein the substrate holding member comprises a pair of clamping members, which vertically clamp the substrate above the base member.

4. The method according to claim 3,
wherein a press plate is stacked on and fixed to the base member and presses the clamping members onto the base member so as to fix the clamping members, and
the press plate is fixed to a supporting section of the base member, by a screw, in a state where the clamping members clamp the substrate above the base member, thereby the clamping members are clamped between the press plate and the base member, and the substrate-holding position is fixed.

5. The method according to claim 3,
wherein the members on and under the substrate holding member are fixed by adhesive or caulking.

\* \* \* \* \*